(12) United States Patent
Wu et al.

(10) Patent No.: US 7,764,820 B2
(45) Date of Patent: Jul. 27, 2010

(54) MULTI-THRESHOLD PERIPHERAL EQUALIZATION METHOD AND APPARATUS FOR DIGITAL MAMMOGRAPHY AND BREAST TOMOSYNTHESIS

(75) Inventors: Tao Wu, Woburn, MA (US); Richard H. Moore, Concord, MA (US); Daniel B. Kopans, Waban, MA (US)

(73) Assignee: The General Hospital Corporation, Boston, MA (US)

( * ) Notice: Subject to any disclaimer, the term of this patent is extended or adjusted under 35 U.S.C. 154(b) by 975 days.

(21) Appl. No.: 11/466,518

(22) Filed: Aug. 23, 2006

(65) Prior Publication Data

US 2007/0047793 A1 Mar. 1, 2007

Related U.S. Application Data

(60) Provisional application No. 60/711,023, filed on Aug. 24, 2005.

(51) Int. Cl.
*G06K 9/00* (2006.01)
*A61B 6/00* (2006.01)

(52) U.S. Cl. .......................... 382/132; 382/172; 378/21

(58) Field of Classification Search ................. 382/100, 382/128, 129, 130, 131, 132, 133, 134, 154, 382/168, 172, 174, 181, 203, 232, 250, 254, 382/260, 274, 275, 276, 280, 288, 291–295, 382/305, 312; 378/4, 21, 62, 5, 9; 62/187
See application file for complete search history.

(56) References Cited

U.S. PATENT DOCUMENTS

| | | | |
|---|---|---|---|
| 5,872,828 A | | 2/1999 | Niklason et al. |
| 6,185,320 B1 * | | 2/2001 | Bick et al. .................. 382/132 |
| 6,557,362 B1 * | | 5/2003 | Wilson ......................... 62/187 |
| 6,950,492 B2 * | | 9/2005 | Besson ........................... 378/5 |
| 7,142,633 B2 * | | 11/2006 | Eberhard et al. .............. 378/62 |
| 7,274,810 B2 * | | 9/2007 | Reeves et al. ............... 382/128 |
| 7,457,451 B2 * | | 11/2008 | Hsieh et al. ................. 382/131 |
| 2005/0089134 A1 * | | 4/2005 | Bruder et al. .................. 378/9 |

* cited by examiner

*Primary Examiner*—Seyed Azarian
(74) *Attorney, Agent, or Firm*—Daly, Crowley, Mofford & Durkee, LLP (57) ABSTRACT

A peripheral equalization (PE) method and apparatus for compensating for thickness reduction in outer edges of the breast in a mammogram (i.e. a two-dimensional image) while keeping the central area substantially unchanged. The PE method and apparatus can also be applied to three dimensional (tomosynthesis) images of a breast. The peripheral equalization is achieved by segmenting the image of the breast into at least two regions and using a multi-threshold technique to process the data in at least one of the two regions.

31 Claims, 6 Drawing Sheets

MULTI-THRESHOLD PERIPHERAL EQUALIZATION METHOD AND APPARATUS FOR DIGITAL MAMMOGRAPHY AND BREAST TOMOSYNTHESIS

CROSS-REFERENCE TO RELATED APPLICATIONS

This application claims the benefit of U.S. Provisional Application No. 60/711,023 filed on Aug. 24, 2005, under 35 U.S.C. §119(e), which application is hereby incorporated herein by reference in its entirety.

STATEMENTS REGARDING FEDERALLY SPONSORED RESEARCH

Not applicable.

FIELD OF THE INVENTION

This invention relates generally to image processing and more particularly to image processing of mammography and breast tomosynthesis images.

BACKGROUND OF THE INVENTION

As is known in the art, in two-dimensional (2-D) mammography and three-dimensional (3-D) breast tomosynthesis images, the peripheral area of the breast tends to have lower intensity than the central area of the breast. This is due at least in part to the thickness of a compressed breast decreasing from the central area to the peripheral area. Thus, to assess an image of the entire breast, a radiologist (or other medical professional or reader of the image) typically must adjust a window-level when reading different areas of the image to increase or decrease intensity levels to make visible certain features within different regions of the breast image (e.g. a central area of the breast vs. a peripheral area of the breast). This renders only portions of the image comparable at any one window-level setting and increases the time it takes to read the image.

Some peripheral equalization (PE) methods have been used in commercial mammography visualization workstations to automatically adjust image parameters to make image features visible in both central and peripheral areas of the breast with one window level setting. These approaches, however, result in undesirable artifacts within the image. In particular, prior art techniques result in the image having so-called segmentation lines and characteristic "overshoot" banding which are distracting and thus undesirable to a reader (e.g. a radiologist or other medical professional) of the image.

SUMMARY OF THE INVENTION

In accordance with the present invention, it has been recognized that it would be desirable to improve the efficiency of image reading and interpretation by equalizing the intensity of the peripheral and central areas of a breast image such that the entire image can be viewed (and thus assessed by a reader) at one window-level setting.

A peripheral equalization (PE) method for digital mammography and breast tomosynthesis includes identifying areas of the breast corresponding to at least a central part and a peripheral part, using a fixed pixel intensity to process pixel data associated with the central part of the breast and utilizing multiple thresholds to process the pixel data associated with the peripheral part of the breast. With this tiered arrangement, an image having a peripheral area with enhanced intensity is provided. The image may be generated via mammography or tomosynthesis. By utilizing a fixed pixel intensity to process pixel data associated with the central part of the breast and utilizing multiple thresholds to process the pixel data associated with the peripheral part of the breast, it is possible to provide two-dimensional and three-dimensional presentations of the breast having an enhanced peripheral area of the breast without also introducing substantial and distracting "segmentation lines" (or boundary effect artifacts) into the image. Thus, a reader of the image can view and assess the breast image at one window-level setting.

In accordance with a further aspect of the present invention, a technique for segmenting and enhancing images includes using multiple thresholds to generate multiple images and averaging corresponding pixel values between each of the images to produce an image having smooth transitions between a central region and peripheral regions of the breast image. With this tiered arrangement, a segmentation and peripheral enhancement technique which provides enhancement of the peripheral area of the breast without also introducing substantial and distracting "segmentation lines" (or a "boundary effect" artifacts) into the image is provided. Thus, the technique of the present invention eliminates the so-called "boundary effect" typically observed in images if only a single threshold is used in the segmentation.

In accordance with a still further aspect of the present invention, a method of processing a mammographic image includes converting a projection map of an image into a density map of the image, performing a transform on the density map, filtering the transformed data, performing an inverse transform on the filtered data to provide a new image and segmenting and enhancing the new image using multiple thresholds to process image data corresponding to at least a peripheral region of a breast in the image to provide an image having peripheral equalization. With this particular arrangement, a technique which provides peripheral equalization in digital mammography data sets and images is provided. By using multiple thresholds, the technique which provides enhancement of a peripheral area of the breast without also introducing substantial and distracting "segmentation lines" (or a "boundary effect" artifacts) into the image is provided. Thus, the technique of the present invention eliminates the so-called "boundary effect" typically observed in images if only a single threshold is used in the segmentation.

A method of processing tomographic image data comprising selecting a subset of the tomographic image data which corresponds to a slice of the image, performing a transform on the selected subset of image data, filtering the transformed data, performing an inverse transform on the filtered data to provide a new image and segmenting and enhancing at least a portion of the subset of the tomographic image data corresponding to a peripheral region of a breast in the new image using multiple thresholds to provide an image having peripheral equalization. With this particular arrangement, a technique which utilizes multiple thresholds to provide a tomographic image having enhanced peripheral areas of the breast without also introducing substantial and distracting "segmentation lines" (or a "boundary effect") into the image is provided. It should be appreciated that a three-dimensional (3-D) tomosynthesis reconstruction can be provided from a plurality of two-dimensional (2-D) images. Thus, the peripheral equalization (PE) technique for a 3-D volume is substantially similar to that for a 2-D image in that the peripheral equalization technique can be applied to each image slice of a 3-D volume. For example, if a 3-D tomosynthesis volume contains fifty 2-D image slices, one approach would be to perform peripheral equalization on each of the 50 slices. Alternatively, the technique can be applied to a subset of the 2-D images which make up the 3-D volume (e.g. the peripheral equalization technique can be applied to one out of every N 2-D image slices). Thus, the second approach is to compute the PE ratio for only certain slices (as opposed to every slice) and then use the PE ratio for neighboring slices. For example, a PE ratio can be computed for slice three and then used for slices one, two, three, four and five. A next PE ratio can then be computed for slice eight and used for slices six, seven, eight, nine and ten. This continues until each slice has a PE ratio applied thereto. This approach works well in those image datasets in which neighbor slices contain similar structures and PE ratios tend to be relatively close. This second approach can reduce the amount of time and/or resources necessary for computations.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

In general overview, the general concept described herein is to estimate the normalized thickness profile (NTP) of a breast from an image (e.g. a mammogram image) and enhance the peripheral area. This can accomplished by dividing the NTP from the mammogram. In one particular but exemplary embodiment, a projection mammogram was first segmented into "breast" and "background" regions using a threshold value computed using the Otsu technique. A segmentation image (SI) was generated in which pixels were assigned a first value (e.g. value of one) in a breast region and a second value (e.g. a value of zero) in background region. The projection was then converted into an attenuation image (AI). A two-dimensional (2D) low-pass filter was applied to the AI in the spatial frequency domain to obtain a blurred image (BI), which primarily reflected variations in breast thickness. The low-pass filter used had the following filter characteristic:

$$F(fx,fy)=1/\{[(1-|fx|/fc)^{128}]*[(1-|fy|/fc)^{128}]\},$$

where fc is the Nyquist frequency.

The BI was multiplied by the SI so that pixels out of the breast were set to zero. The NTP was obtained from the BI using a multi-threshold segmentation method. Five threshold values (Tn) were calculated by Tn=I_ave*Fn, where I_ave was the average intensity of BI and Fn=0.8, 0.9, 1, 1.1, 1.2 respectively. For each threshold Tn, BI was rescaled so that a pixel value V was reset to V/Tn if V≦Tn; and 1 otherwise. The NTP was obtained by averaging the rescaled images from the five thresholds. PE was finally achieved by AI/(NTP^r), with r=0.75 in this example. This method was tested using mammograms acquired from different systems.

Using the above embodiment, the peripheral area of breast images were enhanced without changing the central area. Multi-threshold segmentation for NTP estimation did not result in segmentation artifacts observed in results obtained using conventional PE methods. The selection of low-pass filter and threshold values was not unique as long as the NTP was smooth and related to thickness variations. The final result could be further optimized by adjusting r in range of 0.7-1.0. The above approach results in an efficient PE method which allows all regions of the breast to be visualized in one window-level setting, without compromising image quality.

Figure 1:
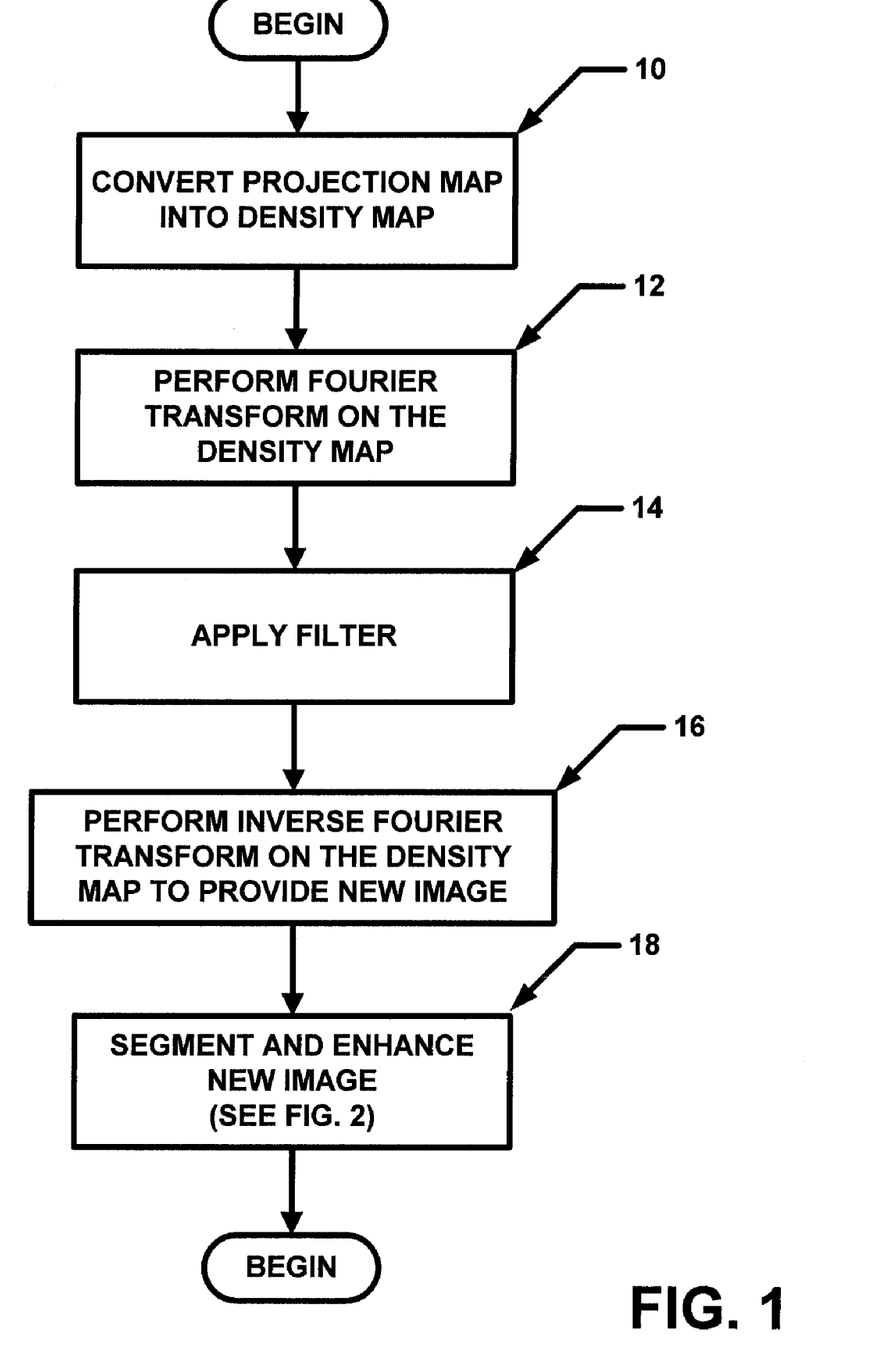
FIG. 1 is a flow diagram which show a process for generating digital mammography and tomosynthesis images having peripheral equalization.
Figure 2:
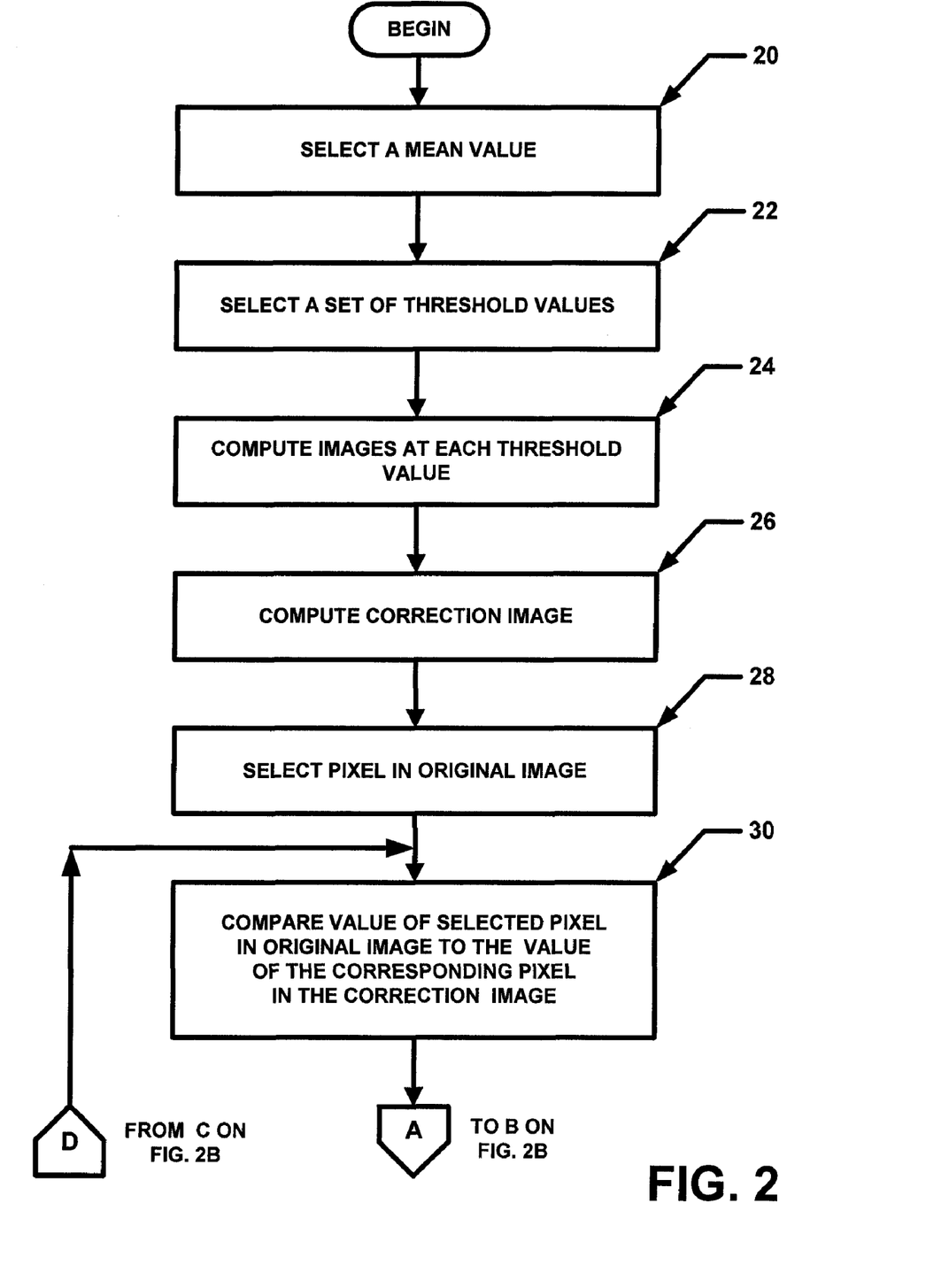
FIGS. 2 and 2A are a series of flow diagrams which show a process for segmenting and equalizing digital mammography and tomosynthesis image data.
Figure 2A:
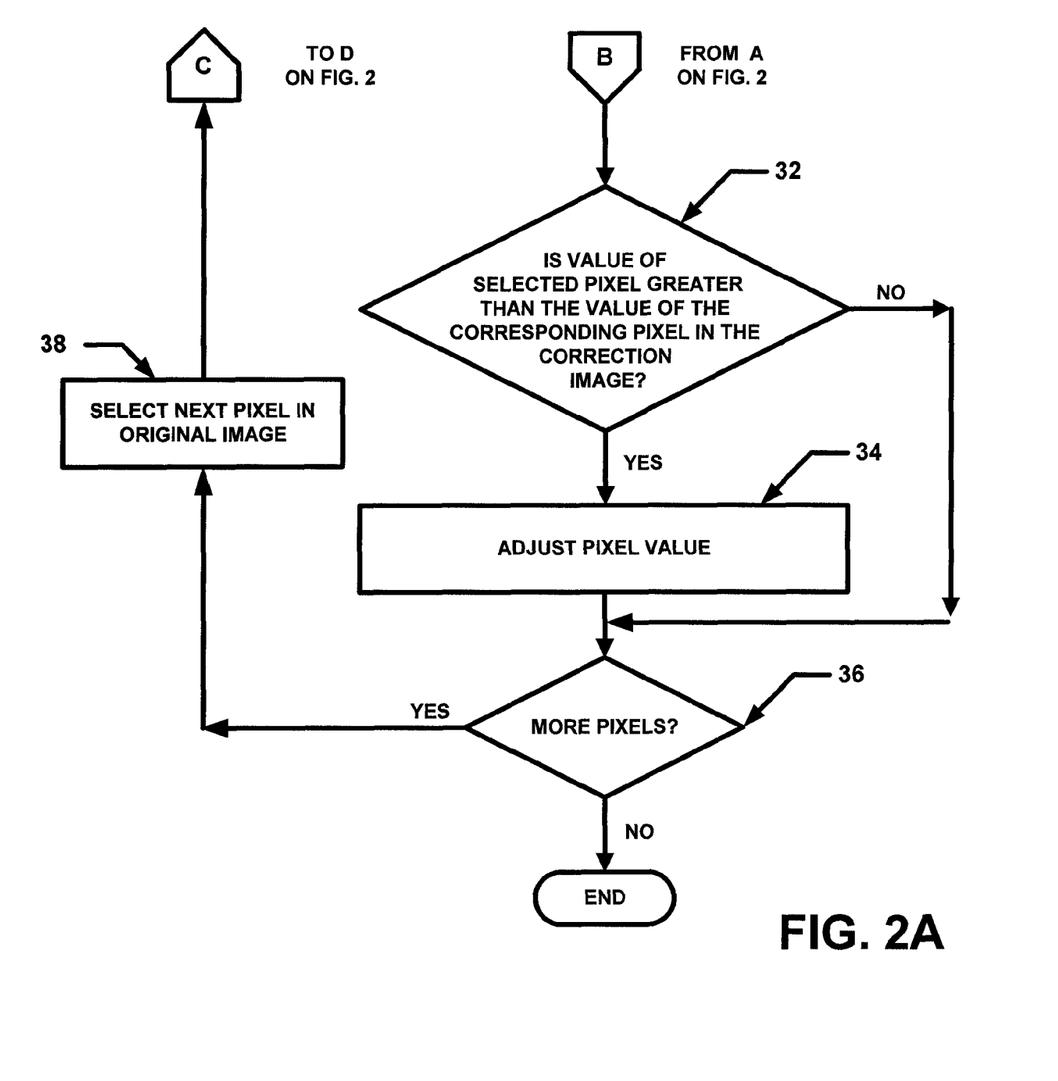

FIGS. 1, 2 and 2A are a series of flow diagrams which show the processing in segmentation and equalization techniques which take place in a system adapted to perform digital mammography or tomosynthesis. The processing can be performed by a processing apparatus which may, for example, be provided as part of a system such as that described below in conjunction with FIG. 5 to generate two-dimensional (mammographic) or three-dimensional image volumes (tomosynthesis) having peripheral equalization.

The segmentation and peripheral enhancement technique described herein uses multiple thresholds to eliminate a "boundary effect" typically observed in images if only a single threshold is used in the segmentation process. Boundary effects are eliminated by using multiple thresholds to process image data corresponding to at least a peripheral area of a breast in the image. The multi-threshold technique can be adapted to provide peripheral equalization in both digital mammography and breast tomosynthesis data sets and presentations. In the description herein, reference is sometimes made to the selection and use of particular parameters and particular values of parameters for the processing. It should be understood that references to any particular parameters and/or values is intended merely to facilitate and provide clarity in the description of the invention and also to aid in the understanding of the general concept of using multiple thresholds to reduce, minimize and even (in some cases) eliminate boundary effects and other image artifacts. Such details (e.g. particular values) are intended only to be exemplary and are not intended as limiting and should not be construed as limiting the scope of the invention.

The rectangular elements in the flow diagram (typified by element 10 in FIG. 1) are herein denoted "processing blocks" and represent computer software instructions or groups of instructions. The diamond shaped elements (typified by element 32 in FIG. 2A), are herein denoted "decision blocks," and represent computer software instructions, or groups of instructions that affect the execution of the computer software instructions represented by the processing blocks.

Alternatively, the processing blocks represent steps performed by functionally equivalent circuits such as a digital signal processor (DSP) circuit or an application specific integrated circuit (ASIC). It should be appreciated that some of the processing and decision blocks described in the flow diagram may be implemented via computer software while others may be implemented in a different manner e.g. via an empirical procedure. The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described in the flow diagrams is illustrative only and can be varied without departing from the spirit of the invention.

It should also be appreciated that the processing described in conjunction with FIGS. 1-2A assumes that data has already been measured in a digital mammography or tomosynthesis system.

Turning now to FIG. 1, processing begins with processing block 10 in which a projection image (e.g. such as that provided by a mammography system) is converted into a density map using conventional techniques. It should be appreciated that in the case where the image data is tomographic image data (often referred to as a "slice"), it is not necessary to generate a density map from projection data. Rather, processing can simply proceed as described below.

Next, as shown in processing block 12, a Fourier transform is performed on the data which provides the density map. Denoting the original image data as i herein, this may be expressed as:

$$i \rightarrow F(i);$$

in which:
i corresponds to the density map; and
F(i) corresponds to the Fourier transform of the density map.

Next, as shown in processing block 14, the Fourier transformed signals are filtered. It is desirable to process image information which relates to variations in thickness of the breast. Thus, Fourier transformed signals are filtered using a filter having filter characteristics selected to enhance the processing of the pertinent information. For example, in those embodiments in which low-frequency information in the image reflects the variation of breast thickness while the high frequency information contains the details, the filter can be provided having a low-pass passband characteristic. In such an embodiment, the low-pass filtering is used to "blur" the details of the structures in the breast because the low-frequency information in the image reflects the variation of breast thickness. The filtering step also can insure that an overall frequency limit is imposed to prevent aliasing and oscillating results. It should be appreciated that the raw data can be unfiltered (and thus can be in violation of the Nyquist sampling criteria). Consequently, the results would be less satisfactory if no filtering were performed.

In a preferred embodiment, a low pass filter is applied to the signals. This can be represented as:

$$F(i) \rightarrow WF(i)$$

in which:
W=a low pass filter characteristic.

In one exemplary embodiment, the low-pass filter used can be represented as $W(f_x, f_y) = 1/(f_x, f_y)^{2n}$ with n=6.

It should be appreciated, however, that N in the range of about 2-10 can also be used. With a range of about 6-10 being preferred.

It should also be appreciated, of course, that the above values may be preferred only in certain implementations and may provide enhanced or nearly optimized results for only in particular implementations. Thus, values for n outside the above range may also be used (i.e. values lower than 2 or values higher than 10). In practice, values for n are empirically selected until the characteristics of the resulting image are such that the efficiency of reading the image by a radiologist (or other medical practitioner viewing the image) is improved.

In the above example, the value of n is selected such that it is large enough so that high-frequency information is filtered out and it is within a range that the resultant filtered image reflects thickness variation. It should be appreciated of course that filters having other characteristics (including other passband characteristics) can also be used.

Once the signals are filtered, an inverse Fourier transform is applied to the filtered signals to provide a new image (denoted i") as shown in processing block 16. This operation may be expressed as:

$$i' = F^{-1} * [WF(i)]$$

in which:
i' represents a new image provided from the filtered set of data points.

Processing then continues to processing block 18 in which the new image is segmented and enhanced via application of multiple thresholds as will be described in detail below in conjunction with FIG. 2. It should be appreciated that it is only necessary to apply the multiple thresholds to the portions of the data corresponding to the peripheral portions of the breast in the image. A fixed pixel intensity can be used to process pixel data associated with the central part of the breast.

In the case of tomographic data, the above process should be repeated for each slice.

Referring now to FIGS. 2 and 2A, a process for performing a multi-threshold segmentation and peripheral enhancement technique includes selecting mean values for each pixel in the new image i' (as described in processing block 16 of FIG. 1) and then selecting a set of threshold values as shown in processing blocks 20 and 22. The set of thresholds {t} may be expressed as:

$$\{t_0 - m, t_0 - (m-1)*\delta, t_0 - (m-2)*\delta, \ldots t_0 + (m-1)*\delta, t_0 + m*\delta\}$$

In one exemplary embodiment, m=2 and δ=5%. It should be appreciated that these values may be selected empirically by considering factors well-known to those of ordinary skill in the art. It should be appreciated that δ is not necessarily 5%. In preferred embodiments, δ is selected to be a number which results in the multiple thresholds used in PE being relatively close to each other and the resultant image having a smooth appearance substantially free of artifacts. In general, however, m is provided having a value in the range of about 1 to about 5 and δ is provided having a value in the range of about 1%-$t_0$ to about 10%-$t_0$. In general, multiple thresholds should be selected to be within about 20% of $t_0$. The number of thresholds used for PE is 2*m+1 and m*δ=20% in this case. The higher the value of m, the smoother the resulting image appears but the more computation which is required.

Processing then proceeds to processing block 24 in which a set of images $\{i'_n(i,j)\}$ are calculated at each threshold. In one exemplary embodiment, if a pixel (i,j) has a value greater than the threshold value $t_n$, then the pixel value $i'_n(i,j)$ is set equal to one. On the other hand, if a pixel (i,j) has a value less than the threshold value $t_n$, then the pixel value $i'_n(i,j)$ is set equal to $i'_n(i,j)/t_n$ (with the value of $t_n$ being computed as shown above). With the set of images represented as $\{i'_n\}$ and each threshold expressed as $t_n$, this may be expressed as:

$$i'_n(i,j) = 1 \text{ if } i'(i,j) \geq t_n$$

$$i'_n(i,j) = i'_n(i,j)/t_n \text{ if } i'(i,j) \geq t_n$$

in which:

t$_n$ is a threshold value; and

{i'$_n$} is the set of threshold images (i.e. images which are computed at each threshold t$_n$).

After this step, the pixel intensities for pixels (i.e. the value of each pixel) in the set threshold images {i'$_n$} is between 0 and 1. In one exemplary embodiment, a correction image i' is calculated by averaging the pixel values in the set of threshold images {i'$_n$}, I'=mean[{i'$_n$}]. In one exemplary embodiment, the pixel intensity for the correction image I' is also between 0 and 1.

The pixel values of the original digital data, represented as i' (which may be mammography data or tomosynthesis data) may then be adjusted in accordance with the values of the corresponding pixel in the correction image I'. It should be appreciated that all, some or none of the pixel values in the original image may be adjusted.

In one exemplary embodiment in which the pixel values of the correction image are scaled to be between zero and one, the value of a pixel in the original image i(i,j) is not changed if the value of the corresponding pixel in the correction image I'(i,j) equals one (or some other predetermined threshold value in the case where the pixel intensities for the correction image I' are not set to be between 0 and 1) and the pixel value of the original image i(i,j) is changed if the value of the corresponding pixel in the correction image I'(i,j) is less than one (or some other predetermined threshold value in the case where the pixel intensities for the correction image I' are not scaled to be between 0 and 1). This may be expressed as:

$$i(i,j) \text{ no change if } I'(i,j)=1$$

$$i(i,j) \to i(i,j)/f \text{ if } I'(i,j)<1$$

The factor f in this technique has the form of I'(i,j)$^x$. It should be appreciated, of course, that there are a plurality of techniques which can be used to obtain f. In one exemplary embodiment, the value of x is set to 0.75 but in general the value of x can be in the range of about 0.1 to about 0.9.

The processing of tomosynthesis reconstruction slices is very similar to processing 2-D digital mammograms, except that the conversion from a projection map to a density map is not used since a tomosynthesis reconstruction slice is already an attenuation map. It should be appreciated that the techniques described herein can be used assuming images have not been processed by some other approaches designed for the same peripheral equalization purpose.

Figure 3:
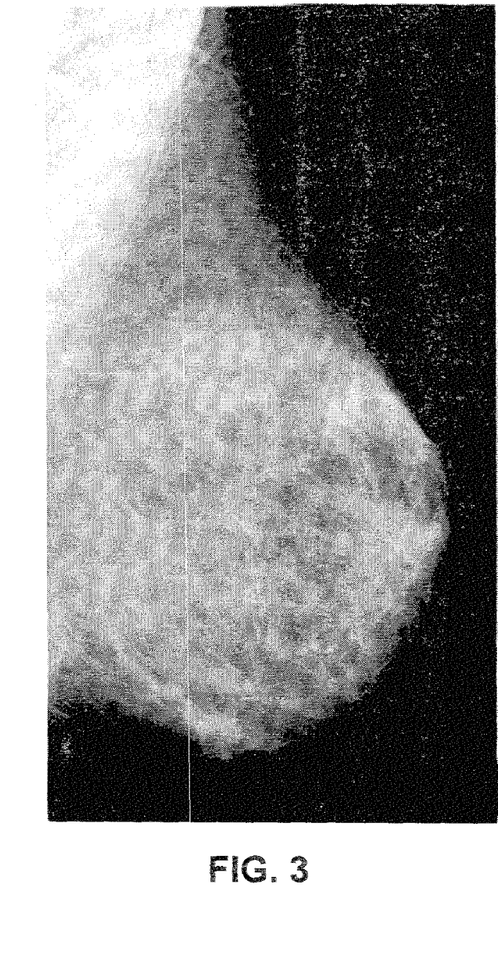
FIG. 3 is a density map of a breast.
Figure 3A:
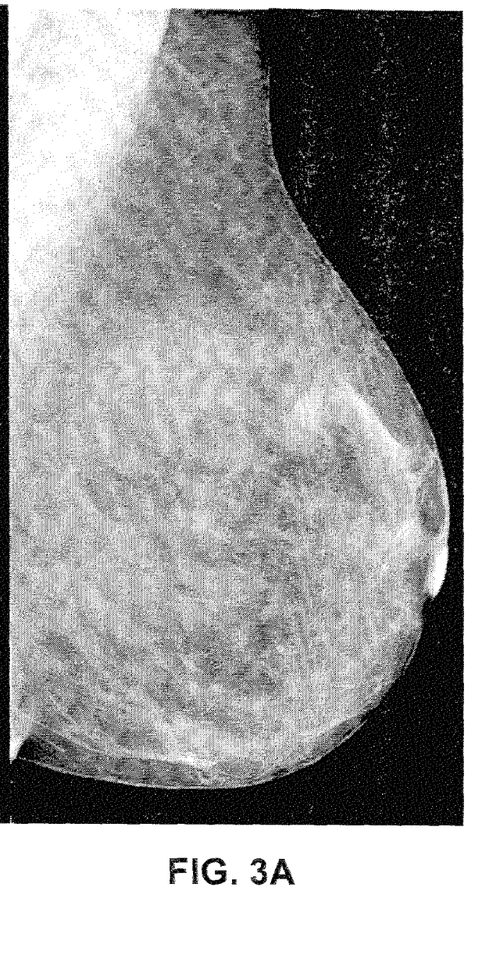
FIG. 3A shows the density map of FIG. 3 after peripheral equalization using the techniques described herein.

Referring now to FIG. 3, a density map of a breast is shown prior to equalization and the same density map is shown in FIG. 3A after peripheral equalization using the techniques described herein. Comparison of FIGS. 3 and 3A clearly reveal that significant peripheral portions of the breast visible in FIG. 3A (after peripheral equalization) are not visible in FIG. 3. Examination of FIG. 3A reveals that substantially no segmentation lines (or "boundary effect" artifacts) are visible in FIG. 3A. Thus, the transition between the central portion of the breast in the image (where only a single threshold is used) and peripheral portions of the breast in the image (where multiple thresholds are used during segmentation and enhancement) is substantially transparent to a reader of the image.

Figure 4:
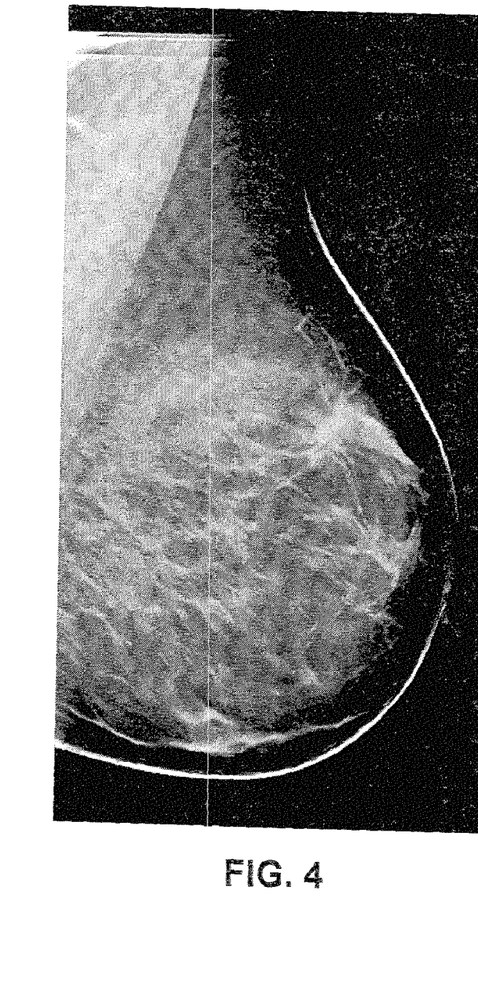
FIG. 4 is a slice from a tomosynthesis reconstruction.
Figure 4A:
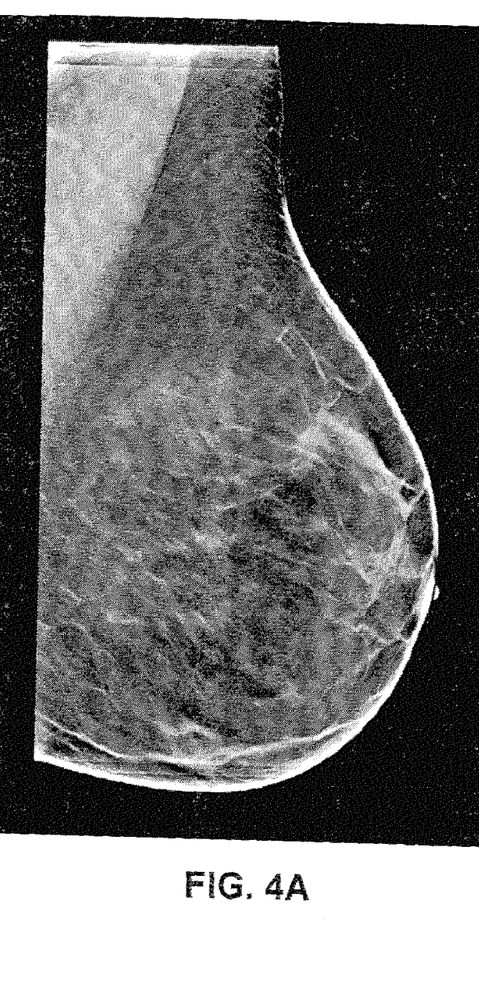
FIG. 4A shows the slice of FIG. 4 after peripheral equalization using the techniques described herein.

Referring now FIG. 4, a slice from a tomosynthesis reconstruction is shown prior to equalization and the same slice is shown in FIG. 4A after peripheral equalization using the techniques described herein. A comparison of FIGS. 4 and 4A reveals that significant peripheral portions of the breast visible in FIG. 4A (after peripheral equalization) are not visible in FIG. 4. Also, it should be appreciated that substantially no segmentation lines (or "boundary effect" artifacts) are visible in FIG. 4A. Thus, the transition between the central portion of the breast in the image (where only a single threshold is used) and peripheral portions of the breast in the image (where multiple thresholds are used) is substantially transparent to a reader of the image.

It should be appreciated that a 3-D tomosynthesis reconstruction can be provided from a plurality of 2-D images. Thus, the peripheral equalization technique for a 3-D volume is substantially similar to that for a 2-D image in that the technique can be applied to each image slice of a 3-D volume. Alternatively, the technique can be applied to one among every N 2-D image slices. For example, if a 3-D tomosynthesis volume contained 50 2-D image slices, one approach would be to run peripheral equalization of each of the 50 slices. A second approach would be to compute the PE ratio for only certain slices (as opposed to every slice) and then use the PE ratio for neighboring slices. For example, a PE ratio can be computed for slice three and then used for slices one, two, three, four and five. This approach works well in those image datasets in which neighbor slices contain similar structures and PE ratios tend to be relatively close. The second approach reduces the amount of time and/or resources necessary for computations.

Figure 5:
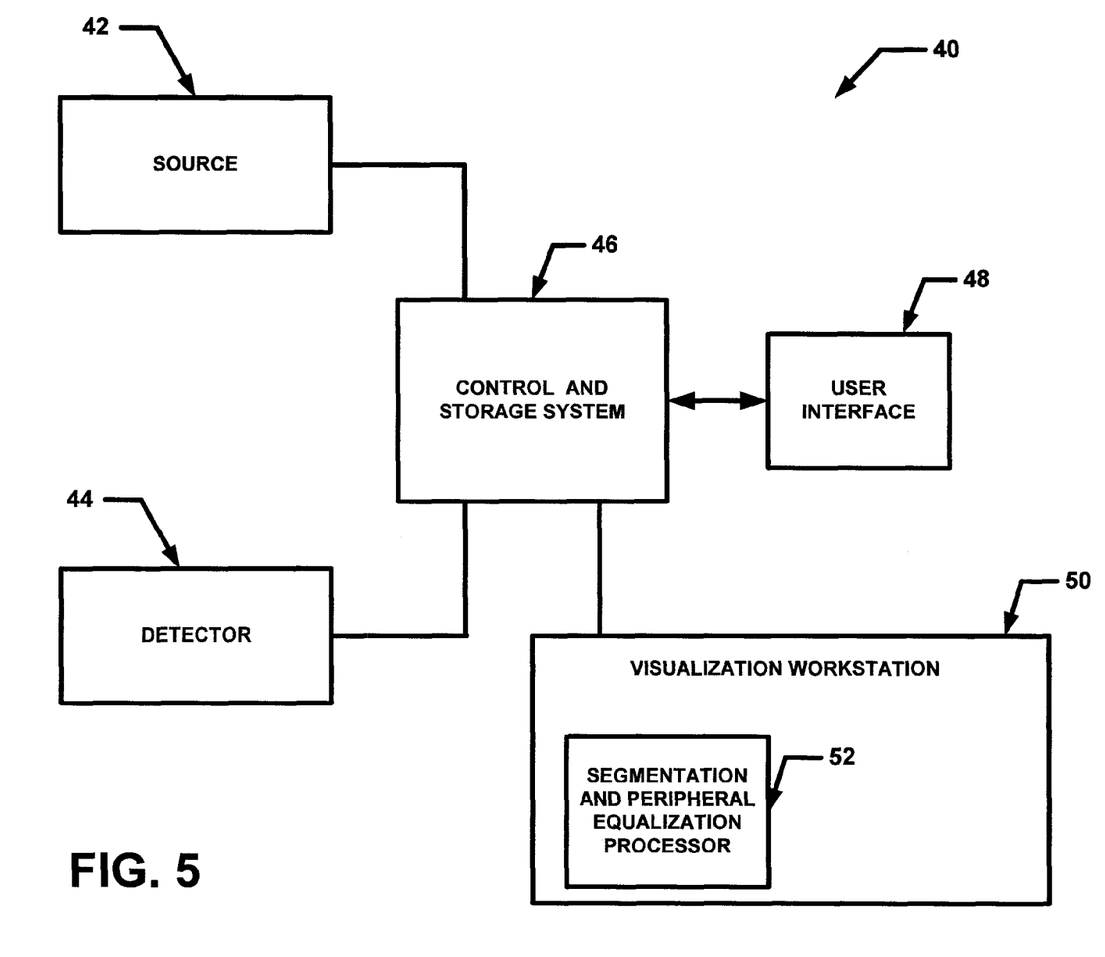
FIG. 5 is a block diagram of a system configurable to provide digital mammography and tomosynthesis images having peripheral equalization.

Referring now to FIG. 5, a system 40 configurable to perform digital mammography and breast tomosynthesis is shown. The system 40 includes a source 42, a detector 44 coupled to a user interface 48 through a control and storage system 46. A visualization workstation 46 for processing digital mammography and breast tomosynthesis images is coupled to the control and storage system and receives image data therefrom. The techniques described above in conjunction with FIGS. 1-4 can be utilized as a tool in the visualization workstation.

In summary, the techniques and apparatus described above can be used to provide digital mammography and breast tomosynthesis images having peripheral equalization achieved by segmenting a breast into at least two breast regions and using a multi-threshold technique in at least the region corresponding to the periphery of the breast. Using the techniques of the present invention, digital mammography and breast tomosynthesis image data can be acquired and read without a reader (e.g. a radiologist or other medical professional) of the images adjusting window-levels when reading different areas of the image (e.g. central and peripheral portions of the breast image). This saves time when reading digital mammography and breast tomosynthesis images.

Although only a few exemplary embodiments of this invention have been described in detail above, those of ordinary skill in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

What is claimed is:

1. A method of processing a mammographic image comprising:
    (a) converting a projection map of an image into a density map of the image;
    (b) performing a transform on the density map;
    (c) filtering the transformed data;
    (d) performing an inverse transform on the filtered data to provide a new image; and (e) segmenting and enhancing the new image using multiple thresholds to process image data corresponding to at least a peripheral region of a breast in the image to provide an image having peripheral equalization.

2. The method of claim 1 wherein filtering comprises applying a low pass filter to the transformed data.

3. The method of claim 2 wherein:

performing a transform on the density map corresponds to performing a Fourier transform on the density map filter to the transformed data; and performing an inverse transform on the filtered data to provide a new image corresponds to performing an inverse Fourier transform on the filtered data to provide a new image.

4. The method of claim 1 wherein segmenting and enhancing the new image comprises:

determining a mean value for each pixel in the new image;
generating a set of threshold values;
generating a set of images at each threshold value;
generating a correction image; and
adjusting at least some of the values of the pixels in the original image based upon a value of the corresponding pixel in the correction image.

5. The method of claim 4 wherein generating a set of thresholds comprises generating a set of threshold values $t_n$ corresponding to:

$$\{t_0-m, t_0-(m-1)*\delta, t_0-(m-2)*\delta, \ldots t_0+(m-1)*\delta, t_0+m*\delta\}$$

where m is provided having a value in the range of about 1 to 5 and $\delta$ is provided having a value in the range of about 1%–$t_0$ about 10%–$t_0$.

6. The method of claim 4 wherein generating a set of images at each threshold value comprises computing a set of images at each threshold value to provide a set of threshold images $\{i'_n\}$ with the values of the pixels in the threshold images selected such that:

$$i'_n(i,j)=1 \text{ if } i(i,j) \geq t_n \text{ and } i'_n(i,j)=i'_n(i,j)/t_n \text{ if } i'(i,j) \geq t_n$$

wherein:

$t_n$ represents a threshold value from n=1 to N;
$i'_n$ represents an image at the $n^{th}$ threshold value; and
$i'_n(i,j)$ corresponds to the value of pixel at location i,j in the threshold image $i'_n$.

7. The method of claim 4 wherein generating a correction image comprises averaging the values of pixels in the set of threshold images to provide pixel values for the correction image.

8. The method of claim 4 wherein generating a correction image comprises computing the mean value of the values of the pixels in the set of threshold images to provide pixel values for the correction image.

9. The method of claim 4 wherein adjusting at least some of the values of the pixels in the original image based upon a value of the corresponding pixel in the correction image comprises not changing a pixel value i(i,j) if the value of the corresponding pixel in the correction image l'(i,j) equals a predetermined threshold value and changing the pixel value i(i,j) if the value of the corresponding pixel in the correction image l'(i,j) is less than a predetermined threshold value.

10. The method of claim 9 wherein in response to the value of the corresponding pixel in the correction image l'(i,j) being less than the predetermined threshold value, adjusting the value of the pixel in the original image i(i,j) as i(i,j)/f where f is a selected factor.

11. The method of claim 10 wherein f is provided having a value computed as $l'(i,j)^x$ where x is a constant having a value in the range of about 0.1 to about 0.9.

12. The method of claim 9 wherein:

the pixel intensity values for each of the threshold images $i'_n$ are between zero and one;
the pixel intensity values for the correction image each are between zero and one; and
the predetermined threshold value is one.

13. A method of processing a tomographic image comprising:

(a) generating tomographic image data;
(b) selecting a subset of the tomographic image data which corresponds to a slice of the image;
(c) performing a transform;
(d) filtering the transformed data;
(e) performing an inverse transform on the filtered data to provide a new image; and
(f) segmenting and enhancing at least a portion of the subset of the tomographic image data corresponding to a peripheral region of a breast in the new image using multiple thresholds to provide an image having peripheral equalization.

14. The method of claim 13 wherein filtering comprises applying a low pass filter to the transformed data.

15. The method of claim 14 wherein:

performing a transform on the density map corresponds to performing a Fourier transform on the density map filter to the transformed data; and performing an inverse transform on the filtered data to provide a new image corresponds to performing an inverse Fourier transform on the filtered data to provide a new image.

16. The method of claim 13 wherein segmenting and enhancing the new image comprises:

determining a mean value for each pixel in the new image;
generating a set of threshold values;
generating a set of images at each threshold value;
generating a correction image; and
adjusting at least some of the values of the pixels in the original image based upon a value of the corresponding pixel in the correction image.

17. The method of claim 16 wherein generating a set of thresholds comprises generating a set of threshold values $t_n$ corresponding to:

$$\{t_0-m, t_0-(m-1)*\delta, t_0-(m-2)*\delta, \ldots t_0+(m-1)*\delta, t_0+m*\delta\}$$

where m is provided having a value in the range of about 1 to 5 and $\delta$ is provided having a value in the range of about 1%–$t_0$ about 10%–$t_0$.

18. The method of claim 16 wherein generating a set of images at each threshold value comprises computing a set of images at each threshold value to provide a set of threshold images $\{i'_n\}$ with the values of the pixels in the threshold images selected such that:

$$i'_n(i,j)=1 \text{ if } i'(i,j) \geq t_n \text{ and } i'_n(i,j)=i'_n(i,j)/t_n \text{ if } i'(i,j) \geq t_n$$

wherein:

$t_n$ represents a threshold value from n=1 to N;
$i'_n$ represents an image at the $n^{th}$ threshold value; and
$i'_n(i,j)$ corresponds to the value of pixel at location i,j in the threshold image $i'_n$.

19. The method of claim 16 wherein generating a correction image comprises averaging the values of pixels in the set of threshold images to provide pixel values for the correction image.

20. The method of claim 16 wherein generating a correction image comprises computing the mean value of the values of the pixels in the set of threshold images to provide pixel values for the correction image.

21. The method of claim 16 wherein adjusting at least some of the values of the pixels in the original image based upon a value of the corresponding pixel in the correction image comprises not changing a pixel value $i(i,j)$ if the value of the corresponding pixel in the correction image $l'(i,j)$ equals a predetermined threshold value one and changing the pixel value $i(i,j)$ if the value of the corresponding pixel in the correction image $l'(i,j)$ is less than a predetermined threshold value.

22. The method of claim 21 wherein in response to the value of the corresponding pixel in the correction image $l'(i,j)$ being less than the predetermined threshold value, adjusting the value of the pixel in the original image $i(i,j)$ as $i(i,j)/f$ where f is a selected factor.

23. The method of claim 22 wherein f is provided having a value computed as $l'(i,j)^x$ where x is a constant having a value in the range of about 0.1 to about 0.9.

24. The method of claim 21 wherein:
the pixel intensity values for each of the threshold images $i'_n$ are between zero and one;
the pixel intensity values for the correction image each are between zero and one; and
the predetermined threshold value is one.

25. A method for estimating the normalized thickness profile (NTP) of a breast from a mammogram of the breast and for enhancing the peripheral area of the breast, the method comprising:
(a) generating a projection mammogram image;
(b) segmenting the projection mammogram image into a breast region and a background region to provide a segmentation image (SI);
(c) converting the projection image into an attenuation image (AI);
(d) filtering data in the AI to generate a blurred image (BI);
(e) multiply the BI by the SI so that pixels out of the breast are set to a value which is different than pixels inside the breast; and
(f) obtaining the NTP from BI using a multi-threshold segmentation technique.

26. The method of claim 25 wherein obtaining the NTP from BI using a multi-threshold segmentation technique comprises:
applying a plurality of different threshold values (Tn) to the BI wherein the threshold values are computed as Tn=I_ave*Fn, where I_ave is the average intensity of BI and Fn=0.8, 0.9, 1, 1.1, 1.2; and
for each threshold Tn, rescaling BI such that a pixel value V was reset to V/Tn if V≦Tn; and 1 otherwise.

27. The method of claim 26 further comprising averaging the rescaled images from the five thresholds to provide the NTP.

28. The method of claim 27 further comprising equalizing the image by AI/(NTP^r), with r=0.75 in this work.

29. The method of claim 25 wherein segmenting the projection mammogram image into a breast region and a background region to provide a segmentation image (SI) comprises assigning each pixel in the breast region a value of 1 and assigning each pixel in the background region a value of 0.

30. The method of claim 25 wherein filtering data in the AI comprises filtering the data in the AI in a spatial frequency domain to generate the blurred image (BI).

31. The method of claim 30 wherein filtering the data in the AI in a spatial frequency domain comprises applying a two-dimensional (2D) low-pass filter to the AI in the spatial frequency domain.

* * * * *

UNITED STATES PATENT AND TRADEMARK OFFICE
CERTIFICATE OF CORRECTION

| | |
|---|---|
| PATENT NO. | : 7,764,820 B2 |
| APPLICATION NO. | : 11/466518 |
| DATED | : July 27, 2010 |
| INVENTOR(S) | : Tao Wu et al. |

Page 1 of 1

It is certified that error appears in the above-identified patent and that said Letters Patent is hereby corrected as shown below:

Abstract, lines 5 and 6 delete "three dimensional" and replace with --three-dimensional--.

Column 2, line 23 delete "(or a "boundary" and replace with --(or "boundary--.

Column 2, line 42 delete "(or a "boundary" and replace with --(or "boundary--.

Column 3, line 23 delete "show" and replace with --shows--.

Column 3, line 44 delete "can" and replace with --can be--.

Column 3, line 51 delete "in" and replace with --in a--.

Column 5, line 25 delete " $-> F(i);$ " and replace with --$i -> F(i);$--.

Column 9, line 33 delete "about" and replace with --to about--.

Column 9, line 40 delete "...i(i,j)..." and replace with --...i'(i,j)...--.

Column 10, line 51 delete "about" and replace with --to about--.

Signed and Sealed this
Fourth Day of January, 2011

David J. Kappos
*Director of the United States Patent and Trademark Office*